US012082043B2

(12) United States Patent
Kojokaro et al.

(10) Patent No.: US 12,082,043 B2
(45) Date of Patent: Sep. 3, 2024

(54) PARALLEL CHANNEL LISTENING DEVICE AND METHOD

(71) Applicant: Intel Corporation, Santa Clara, CA (US)

(72) Inventors: Chen Kojokaro, Yokneam Illit (IL); Minyoung Park, San Ramon, CA (US); Ehud Reshef, Kiryat Tivon (IL); Danny Alexander, Neve Efraim Monosson (IL); Nir Yizhak Balaban, Kfar Netter (IL); Ofir Klein, Tel Aviv (IL)

(73) Assignee: INTEL CORPORATION, Santa Clara, CA (US)

( * ) Notice: Subject to any disclaimer, the term of this patent is extended or adjusted under 35 U.S.C. 154(b) by 832 days.

(21) Appl. No.: 17/032,030

(22) Filed: Sep. 25, 2020

(65) Prior Publication Data

US 2022/0104070 A1 Mar. 31, 2022

(51) Int. Cl.
 *H04W 28/06* (2009.01)
 *H04L 69/22* (2022.01)
 *H04W 74/0816* (2024.01)

(52) U.S. Cl.
 CPC .......... *H04W 28/065* (2013.01); *H04L 69/22* (2013.01); *H04W 74/0816* (2013.01)

(58) Field of Classification Search
 CPC .......... H04W 28/065; H04W 74/0816; H04W 76/27; H04W 52/0251; H04W 84/12; H04W 52/0225; H04W 52/0209; H04L 69/22; Y02D 30/70
 See application file for complete search history.

(56) References Cited

U.S. PATENT DOCUMENTS

| 2011/0225440 | A1* | 9/2011 | Kwon | H04W 52/0225 |
| | | | | 455/127.5 |
| 2018/0352511 | A1* | 12/2018 | Martin | H04W 52/0229 |
| 2020/0107393 | A1* | 4/2020 | Chu | H04L 1/0003 |
| 2022/0264429 | A1* | 8/2022 | Gan | H04W 52/0219 |

OTHER PUBLICATIONS

Chittabrata, Ghosh et al., "Sleep States in IEEE 802.11ax Simulation Scenarios", IEEE, dated Mar. 9, 2015, 12 pages.
Minyoung, Park et al., "Enhanced multi-link single radio operation", IEEE, dated Jun. 4, 2020, 22 pages.
European Search Report issued for the corresponding European patent application No. 21191040.1, dated Feb. 1, 2022, 10 pages (for informational purposes only).

* cited by examiner

*Primary Examiner* — Walli Z Butt
(74) *Attorney, Agent, or Firm* — VIERING, JENTSCHURA & PARTNER MBB

(57) ABSTRACT

A method of wireless communication comprising decoding in a physical layer circuitry a received wireless signal; outputting a corresponding wireless signal data as one or more data packets, the wireless signal data representing the received wireless signal; determining one or more packet header parameters of the one or more data packets; and if any of the one or more packet header parameters equal any of one or more predetermined values, instruct a medium access control layer circuitry to switch from an inactive mode to an active mode.

18 Claims, 6 Drawing Sheets

PARALLEL CHANNEL LISTENING DEVICE AND METHOD

TECHNICAL FIELD

Aspects of the disclosure described herein generally relate to management of a parallel channel listen phase in wireless communication.

BACKGROUND

Various wireless communication devices and/or wireless communication protocols permit transmission on only one wireless channel, but allow for listening on two or more channels. For example, The Institute of Electronics Engineers (IEEE) standard IEEE802.11be, Enhancements for Extremely High Throughput (EHT) (referred to herein as "Wi-Fi 7") defines a cost-efficient Enhanced Single Radio Enhanced Single Radio (eSR) device class that while limited to communication on a single channel at a time is still able to listen and wait for Access Point (AP) traffic on two or more channels.

Although such techniques may advantageously be applied using a variety of mobile communication device configurations (e.g., a single radio (e.g. transceiver) with a plurality of antennas, or a plurality of radios with a plurality of antennas), one advantage may be in allowing an at least 2×2 single radio (e.g. a device with a single radio, but with at least two antennas, such as a single-radio Multiple Input Multiple Output (MIMO) device) to function as a dual 1×1 receiver while waiting for indication from the AP that it should operate on a pre-configured link.

To take advantage of the capacity of Wi-Fi 7 permit transmission on only one wireless channel while allowing for listening on two or more channels, it is necessary to have an effective procedure to handle a parallel channel listen phase. Current Wi-Fi 7 standards do not specify such a procedure.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DETAILED DESCRIPTION

Figure 1:
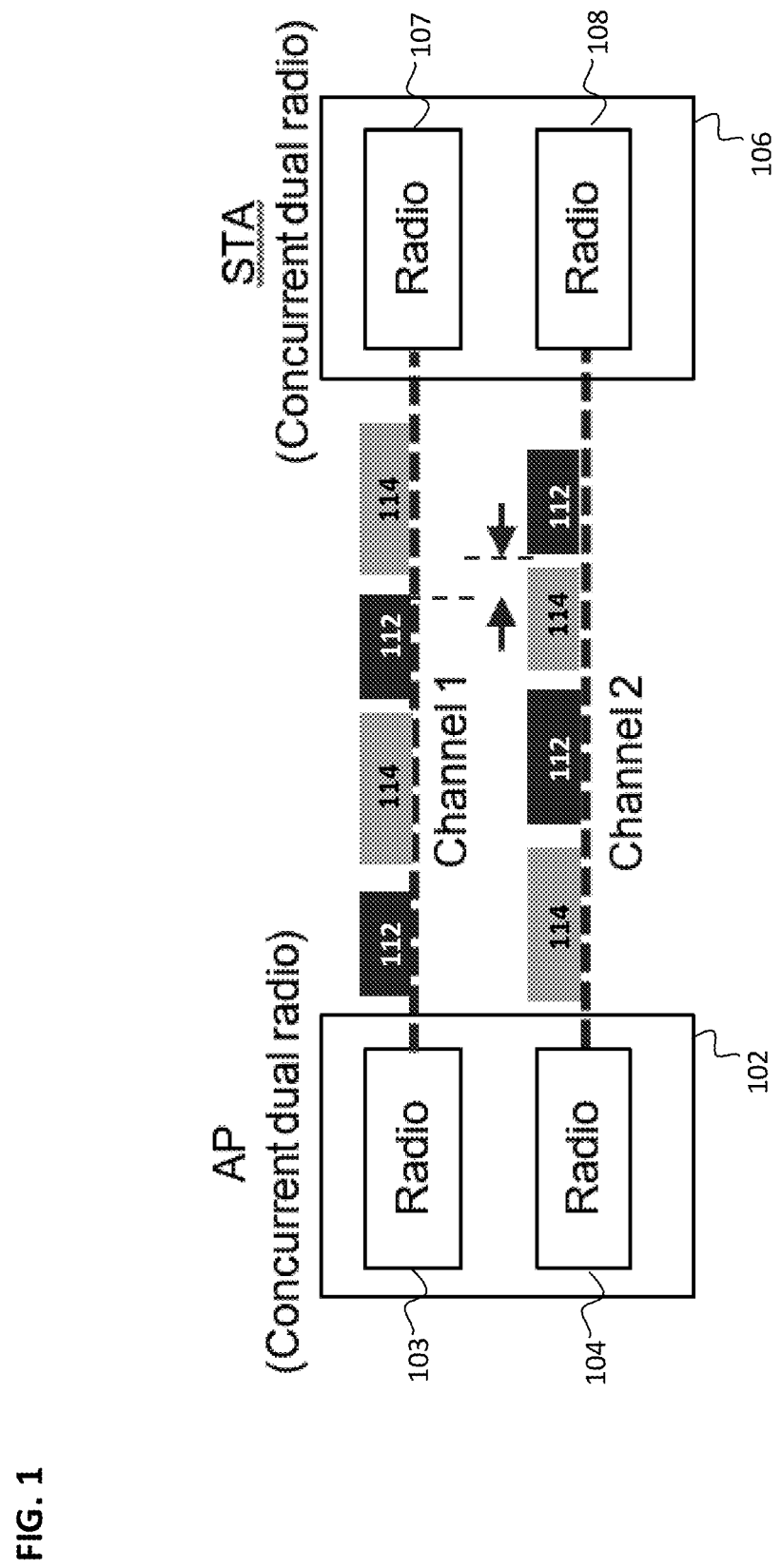
FIG. 1 depicts a known dual radio communication device.

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

The word "exemplary" is used herein to mean "serving as an example, instance, or illustration". Any embodiment or design described herein as "exemplary" is not necessarily to be construed as preferred or advantageous over other embodiments or designs.

Throughout the drawings, it should be noted that like reference numbers are used to depict the same or similar elements, features, and structures, unless otherwise noted.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. The terms "group (of)", "set (of)", "collection (of)", "series (of)", "sequence (of)", "grouping (of)", etc., and the like in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

Although the term "eSR" is used throughout, the eSR may also be known as an enhanced multi-link single-radio (eMLSR) or an enhanced multi-link (eML).

Because the concept of eSR is first addressed in the Wi-Fi 7 standard, there are no preexisting solutions that address eSR operation. A trivial solution is for an eSR device to incorporate a dual Medium Access Control (MAC) circuitry connected to a Physical Layer (PHY) circuitry that is capable of operating in either of a single 2×2 or a dual 1×1 mode. Such solutions are, in essence, dual radio solutions, which are currently in existence.

Alternatively, eSR devices can, however, be configured to yield reduced costs and/or greater efficiency compared to a dual radio solution, while approximating the performance of a dual radio. Implementation of eSR on Multi Link Single Radio devices requires an efficient frame drop mechanism. Frame-dropping itself is known; for example, IEEE 802.11ax (hereinafter "Wi-Fi 6") utilizes a spatial-reuse feature that allows the physical layer circuit to implement a level drop mechanism using the Basic Service Set (BSS) Color field in high efficiency signal A (HE SIG-A). This was used primarily for power efficiency and for reuse of the channel capacity. Known frame drop mechanisms, such as the above mechanism relative to Wi-Fi 6, however, require robust radio capabilities that are associated with additional costs, and which may still add significant costs to a Wi-Fi product. Thus, the known frame drop solutions may be undesirable in this context.

The eSR solution described herein detects relevant frames and eliminates non-relevant frames. This eSR implementation may achieve this without requiring implementation of a full MAC circuitry. Aspects of the disclosure further describe procedures to detect whether incoming frames indicate the start of an eSR transmission opportunity (TxOP). Furthermore, these procedures may be implemented with reduced or minimal overhead on the Radio PHY and MAC circuitry.

By way of background, it is known to use a dual radio communication device to receive and/or transmit on two different channels. FIG. 1 depicts a known dual radio communication device. In this figure, an AP 102, having a first radio 103 and a second radio 104, transmits on a first channel and a second channel, respectively. A communication device 106 (e.g. a user device) has a first radio 107 and a second radio 108. Despite both channel 1 and channel 2 being available, the AP 102 typically transmits only on one channel (e.g. channel 1 or on channel 2) at a given time. In this image, the darker-shaded blocks 112 represent transmissions, and the lighter-shaded blocks 114 represent waiting times (e.g. non-transmission times). As can be seen, transmissions on two different channels do not necessarily overlap (e.g. occur at the same time). When transmissions on different channels do not tend to occur at the same time, a single radio having alternative access to both channels can theoretically receive the transmissions on both channel 1 and channel 2.

Multi Link Single Radio devices represent an alternative to a dual Radio configuration. In certain devices or in certain implementations (e.g. for cost-saving and/or power-saving reasons), it may be desired to implement a single radio in a device rather than two radios. eSR configurations according to aspects of the disclosure can be implemented to achieve a significant portion of the benefits gained in a dual radio user experience. The eSR may be configured to utilize a single radio to operate with two antennas. Each of the two antennas may be allocated to a different channel, and the single radio may be configured to listen alternatively to either of the two channels.

Figure 2:
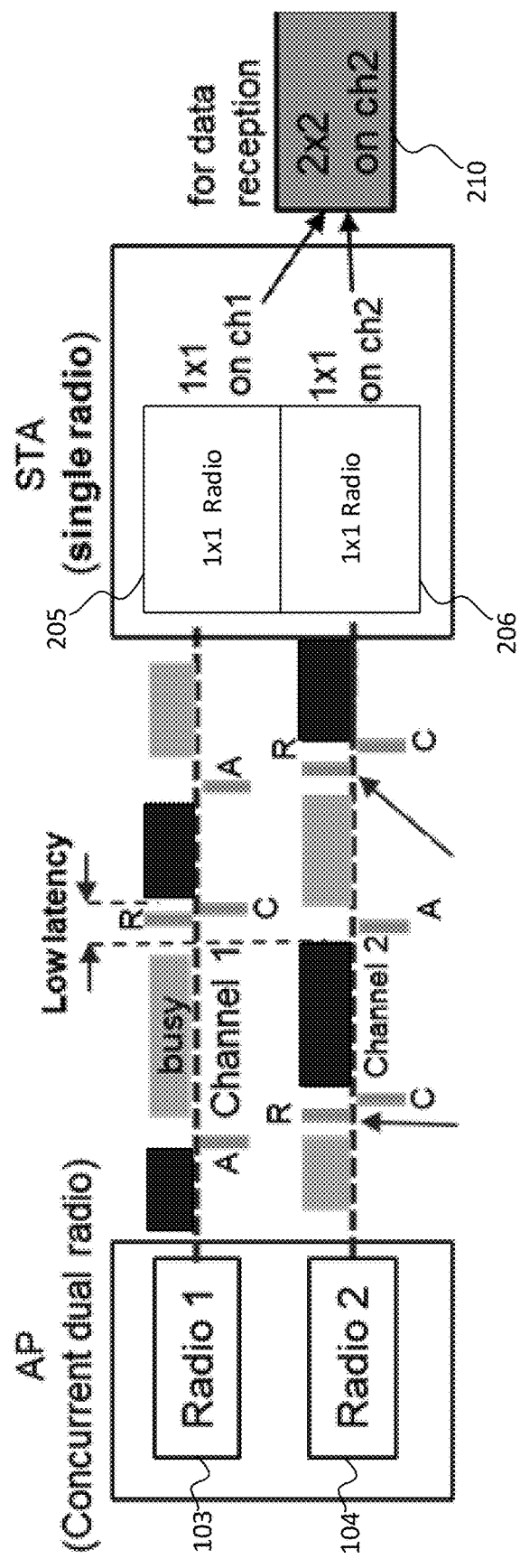
FIG. 2 depicts a single radio device (e.g. a user device, a user communication device) performing a dual channel data reception operation.

FIG. 2 depicts a single radio device (e.g. a user device, a user communication device) performing a dual channel data reception operation, according to an aspect of the disclosure. This single radio device may optionally be configured as a single radio MIMO device, in which the MIMO antennas, which would normally be configured to receive on the same channel, are configured to receive on different channels (e.g. channel 1 and channel 2, as depicted in FIG. 2). The AP may transmit, for example, with a first radio 103 on a first channel (channel 1) and with a second radio 104 on a second channel (channel 2). The single radio user device 210 may be configured to receive wireless signals of a first channel (channel 1) on a first antenna 205 and radio signals of a second channel (channel 2) on a second antenna 206.

The AP may transmit, for example on the first channel 211. The AP may then transmit on the second channel, for example by transmitting a channel switch signal 212, which may indicate that the AP is seeking to transmit on a particular channel. Although multiple types of channel switch signals are possible and may be used in accordance with the disclosure, one channel switch signal that may be used is a Request to Send (RTS) signal. In an RTS signal, the AP may transmit a request (denoted as an "R" in FIG. 2). Assuming that a transmission is possible, wireless stations (e.g. user devices) may respond with a clear to send signal (denoted as "C" in FIG. 2), at which time the AP is clear to begin transmission (shown as a dark-shaded region in FIG.

2). At the conclusion of the transmission, the wireless station may respond with an acknowledgement (denoted as "A" in FIG. 2). In the multi-user context, the AP may send a multi-user request to send (MU-RTS) signal, which may operate in much the same way as a RTS, in that the MU-RTS indicates the AP's intention to transmit and requests a clear to send signal from one or more stations.

Stations (e.g. user devices, communication devices) may operate within a multi-channel communication context using, for example, one radio per channel, or few radios than one radio per channel. In a two-channel context, stations may operate in a multi-channel communication context using one radio or two radios. Although the following describes two-channel communication, the principles and methods described herein are not limited to two-channels and can be employed in communication environments with a single channel, two channels, or more than two channels.

As stated above, in some configurations, the number of antennas and/or the number of transmit channels may be greater than the number of radios on a receiving device, as is depicted in FIG. 2, with the single radio device 210 receiving on two different channels. The single radio may only be able to receive on one channel at a time. As such, there exists a need to determine when an AP is transmitting or will be transmitting on a given channel. Furthermore, and because Multi Link systems may have multiple stations subscribed to a single AP, many AP transmissions may be directed to one or more other stations and may not be relevant for a given station. As such, it is desired to quickly identify these irrelevant transmissions so that they may be disregarded and/or so that station resources are preserved and reduced decoding and/or processing of irrelevant transmissions takes place.

In a Multi Link context, the AP may be able to direct one or more stations (e.g. the user device with all the corresponding resources such as antennas, main modem, MAC, etc.) to a particular channel for transmission. This flow requires a channel switch signal (e.g. such as an RTS frame) in the desired channel. Various principles and methods disclosed herein take advantage of this transmission of the channel switch signal to identify upcoming transmissions and determine their relevance for a particular station. Otherwise stated, aspects of the disclosure focus on strategies to detect the channel switch signal initiating an eSR transmission opportunity (TxOP) and to eliminate processing of all other frames in the channel.

Figure 3:
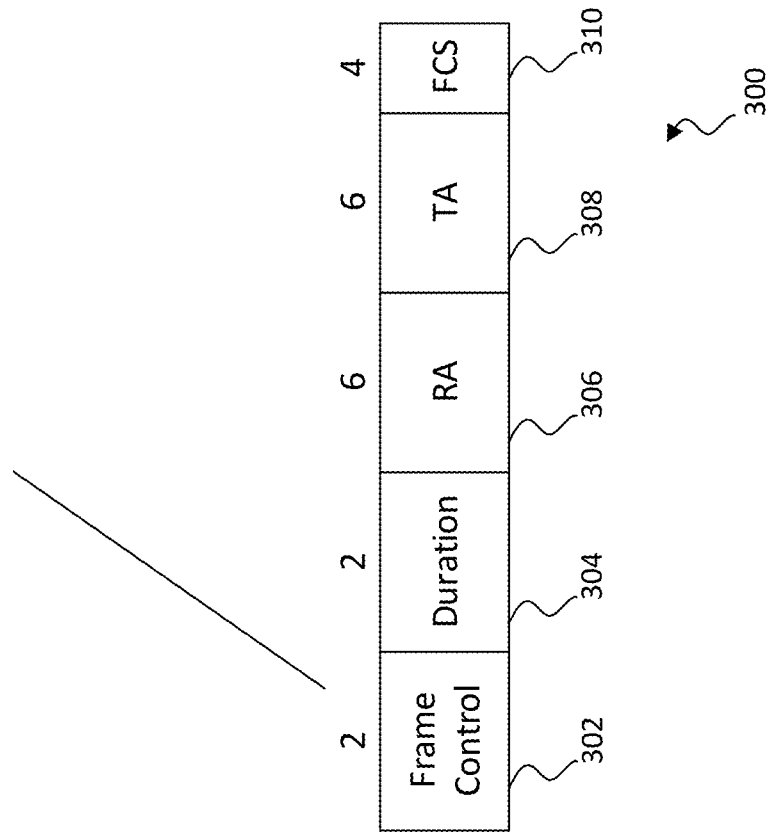
FIG. 3 depicts a configuration of a wireless frame format.

FIG. 3 depicts a configuration of a wireless frame format 300, according to an aspect of the disclosure. The version of the wireless frame format depicted herein corresponds to Wi-Fi 7, although it is noted that aspects of the disclosure described herein may be implemented with other frame formats, and this should not be understood as being limited specifically to Wi-Fi 7. As depicted herein, wireless transmissions may be organized in packets having a packet hear (or merely, "header") and a payload. The header may include a frame control portion 302, a duration 304, a recipient address (RA) 306, a transmitter address (TA) 308, and a frame check sequence 310. The frame control portion 302 may include a type of frame (e.g. whether the frame is a control frame, a management frame, or a data frame) and may provide a variety of control information. The duration 304 may indicate a duration during which the channel will be utilized for transmission. According to one aspect of the disclosure, the duration frame may include, for example, a duration in which the channel will be occupied. According to another aspect of the disclosure, this duration may be formulated as a number of microseconds. The recipient address 306 may include an indicator or address of the intended recipient of a packet, such as a MAC address. The transmitter address 308 may include an indicator or address of the transmitter of a packet, such as a MAC address. The frame check sequence 310 may include a cyclic redundancy check.

Stations may use various aspects of these headers to determine whether a transmission is relevant for the station. If the station determines that the transmission is irrelevant, the station may discontinue processing some or all of the remaining transmission. Furthermore, this determination of whether the transmission is relevant for the station may be carried out in the physical layer (e.g. in a physical layer circuitry). The physical layer circuitry may be configured to make this relevancy determination while a medium access control layer is in a sleep or standby mode. Attention will now be turned to strategies for the physical layer circuitry to determine a relevancy of a transmission.

The channel switch signal may have limited physical data rates (also known as PHY rates), limited frame length options, and/or certain MAC header indications such as the router advertisement (RA) field or the FrameControl Field, which indicate that the transmission is irrelevant to the station. The station's physical layer circuitry can use some or all of this information to eliminate the frame (e.g. the transmission) without waking up the medium access control circuitry. For example, when the channel switch signal is an RTS frame, the channel switch signal may have a fixed length or a predetermined length. Furthermore, the PHY rate of the frame may be limited to basic rates, rather than certain high-throughput rates. In light of this, the PHY module can safely drop any received packet that is transmitted at a PHY rate higher than the basic rates by decoding the Rate field, or by decoding the LENGTH field of the received packet and determining that the length does not match the length of an RTS frame. This will be described in greater detail below.

According to an aspect of the disclosure, the Frame Control portion 302 may be subdivided into a variety of subcategories, including, but not limited to, a protocol version, a type, a subtype, and others. The following table depicts non-limiting examples of various frame control types:

| Type value B3 B2 | Type description | Subtype value B7 B6 B5 B4 | Subtype description |
|---|---|---|---|
| 10 | Data | 0111 | Reserved (#65) |
| 10 | Data | 1000 | QoS Data |
| 10 | Data | 1001 | QoS Data + CF-Ack |
| 10 | Data | 1010 | Qos Data + CF-Poll |
| 10 | Data | 1011 | QoS Data + CF-Ack + CF-Poll |
| 10 | Data | 1100 | QoS Null (no data) |
| 10 | Data | 1101 | Reserved |
| 10 | Data | 1110 | QoS CF-Poll (no data) |
| 10 | Data | 1111 | QoS CF-Ack + CF-Poll (no data) |
| 11 | Extension | 0000 | DMG Beacon |
| 11 | Extension | 0001 | S1G Beacon(11ah) |
| 11 | Extension | (11ah)0010-1111 | Reserved |

According to an aspect of the disclosure, a station may be configured to ignore transmissions until it receives a channel switch signal. The channel switch signal may be used to indicate a downlink transmission in a specific channel. As described herein, and based on one or more detected factors in the channel switch signal, the station may be configured to continue listening (e.g. decoding the transmission), or the station may determine that the transmission is irrelevant and may discontinue listening.

According to an aspect of the disclosure, one or more stations may be configured to decode the frame type from the AP, and the one or more stations may be configured to either continue decoding or to cease decoding based on the decoded frame type. For example, as shown above, a channel switch signal in an RTS format may indicate a "control" frame type (code 01), followed by an RTS subtype (code 1011). Because the RTS may indicate that the AP desires to transmit on a particular channel, it may be desired for the station to continue decoding, so as to receive any relevant message for the station. Conversely, if the type and/or subtype do not indicate an intended transmission, the station may be configured to disregard a reminder of the transmission.

According to an aspect of the disclosure, the station may be configured to disregard packets having a management subtype (type value 00) and/or a control subtype (type value 01).

Thus, it is desired for the station to quickly detect whether a given transmission is a channel switch signal. According to an aspect of the disclosure, and by utilizing an aspect of a Wi-Fi transmission protocol, the station may readily detect channel switch signals. If the station detects a channel switch signal, the physical layer circuitry of the station may be configured to continue decoding the channel switch signal, whether the entirety of the channel switch signal, or until the station decodes an indication in the channel switch signal that the transmission or a related transmission is irrelevant (e.g., a transmission for another station). If the physical layer circuitry decodes some or all of a transmission and determines that the signal is not a channel switch signal, the physical layer circuitry may be configured to cease decoding of the transmission.

The station (e.g. the physical layer circuitry) may also rely on data rates to determine whether to continue decoding a transmission or to discontinue decoding. Wi-Fi 7 is expected to deliver increases in throughput of wireless communications. Throughput is a known concept in communication networks and generally describes the rate of data delivery in a communication channel. The throughout may be measured, for example, as a number of bytes over time. Throughput may be classified according to a variety of standards. According to one aspect of the disclosure, throughout may be classified as non-high throughput (non-HT), high throughput (HT), very high throughout (VHT), high efficiency (HE), or extremely high throughput (EHT). Although Wi-Fi 7 may be capable of transmitting according to any of these throughput classifications, it is expected that channel switch signals will be not be transmitted according to a HT standard or a standard having greater than HT. Rather, it is expected that channel switch signals will be transmitted according to non-HT.

According to an aspect of the disclosure, the station may decode a transmission to determine the physical data rate, which represents a throughput. According to one aspect of the disclosure, the physical data rate may be included in the transmission header. The structure of transmission headers (e.g. the byte location and/or location relative to time of specific information) varies between various wireless protocols, and between various versions of wireless protocols (e.g. legacy Wi-Fi versions and Wi-Fi 6). Furthermore, Wi-Fi 7 is not yet publically released and may be subject to change from its current draft. As such, it is not believed that a recitation of the specific byte number(s) of the various, relevant wireless protocols for the physical data rate aids in the understanding of this disclosure. Rather, the person skilled in the art will appreciate that the physical data rate is encoded and transmitted as part of the frame header in many wireless protocols, and the person skilled in the art will understand where in the frame header the physical data rate is located for a given wireless standard and/or how to determine the frame header location of a physical data rate based on a wireless protocol standard.

Under Wi-Fi 7, the channel switch signal type is assumed not to be a high throughput (HT) frame (e.g. a non-HT frame). The physical layer circuitry may determine from the channel switch signal (e.g., such as by decoding a frame rate field) whether the channel switch signal is HT or non-HT. If the frame rate is HT, very high throughput (VHT), high-efficiency (HE), extremely high throughput (EHT) and above physical protocol data unit (PPDU) types, then the station may determine that the frame is not a channel switch signal. As such, the station may be configured to disregard (e.g. not decode) some or all of the transmission. Assuming that the detected physical data rate represents a non-HT physical data rate, then the transmission may be a channel switch signal. In this event, the station may be configured to continue decoding some or all of the transmission, as described further herein.

The determination of whether or how much of a transmission to decode may be based on an order in which the relevant information becomes available to the station. For example, the physical layer may determine the physical data rate, and thus the throughout, of a given transmission (e.g. such a number of bytes over a duration of time). As described above, the station may discontinue decoding the transmission (e.g. whether for a predetermined duration, such as a duration of a channel switch signal, for a duration of the transmission as transmitted in the length portion of the header, or otherwise). The physical layer circuitry of the station may further decode one or more packet header parameters, as described above, and these other packet header parameters may be used to determine how, whether, and/or when to discontinue decoding, and/or whether and when to resume decoding. Such packet header parameters include, but are not limited to, a frame type, a frame duration, an intended recipient, an identity of the transmitter, or otherwise.

With respect to a frame duration (a frame duration may be provided, for example, in bytes; alternatively, since a number of bytes may have a fixed relation to time (e.g. based on data rate), the duration may be considered in time (e.g. microseconds)), it is expected that a channel switch signal in a given protocol will have one or more predetermined durations. That is, the header will indicate a transmission duration. Since a channel switch signal may have one or more predetermined durations, a station decoding the header may quickly decode the duration field and determine whether the decoded duration corresponds to the one or more predetermined duration of the channel switch signal. If the decoded duration corresponds to the one or more predetermined duration of a channel switch signal, then the station may continue to decode unless or until another packet header parameter indicates that the transmission is irrelevant to the station. If the decoded header duration does not correspond to the one or more predetermined duration of a packet header, then the device may determine that the transmission is not a channel switch signal, and the device may discontinue decoding.

According to another aspect of the disclosure, even if the frame type and/or subtype does not indicate a relevant transmission for the station, the station may continue to decode the frame to receive the frame duration. In continuing to decode the frame duration, the station may be able to determine that a packet having a transmission duration of x is not directed to the station, or is otherwise irrelevant for the station. Using this information, the station may cease decoding throughout the remaining duration of x.

Following the duration, other aspects of the frame may indicate that a packet is irrelevant to a given station. For example, the recipient address 306, which may indicate an intended recipient, may be used to determine relevance for the station. That is, each station will have an identifier (e.g. a MAC address), and by comparing the intended recipient to its own MAC address, the station may be able to determine whether a forthcoming packet is intended for that station. If the packet is not intended for the station, the packet may be disregarded and the physical layer circuitry may be configured to discontinue decoding of the packet. Otherwise stated, if the packet is not for the station, the station may elect not to continue some or all of the remaining packet. For example, the station may cease decoding until expiration of the decoded transmission duration.

According to another aspect of the disclosure, the station may use the transmitter address 308 to determine relevance. The transmitter address is expected to correspond to an identifier of a transmitting entity (e.g., a server). The station may be configured with a list of transmitter addresses corresponding to relevant transmissions and/or a list of transmitter addresses corresponding to non-relevant transmissions. The station may elect to decode a packet from a transmitter address associated with relevant transmissions and/or not to decode a packet from a transmitter address corresponding to non-relevant transmissions.

Figure 4:
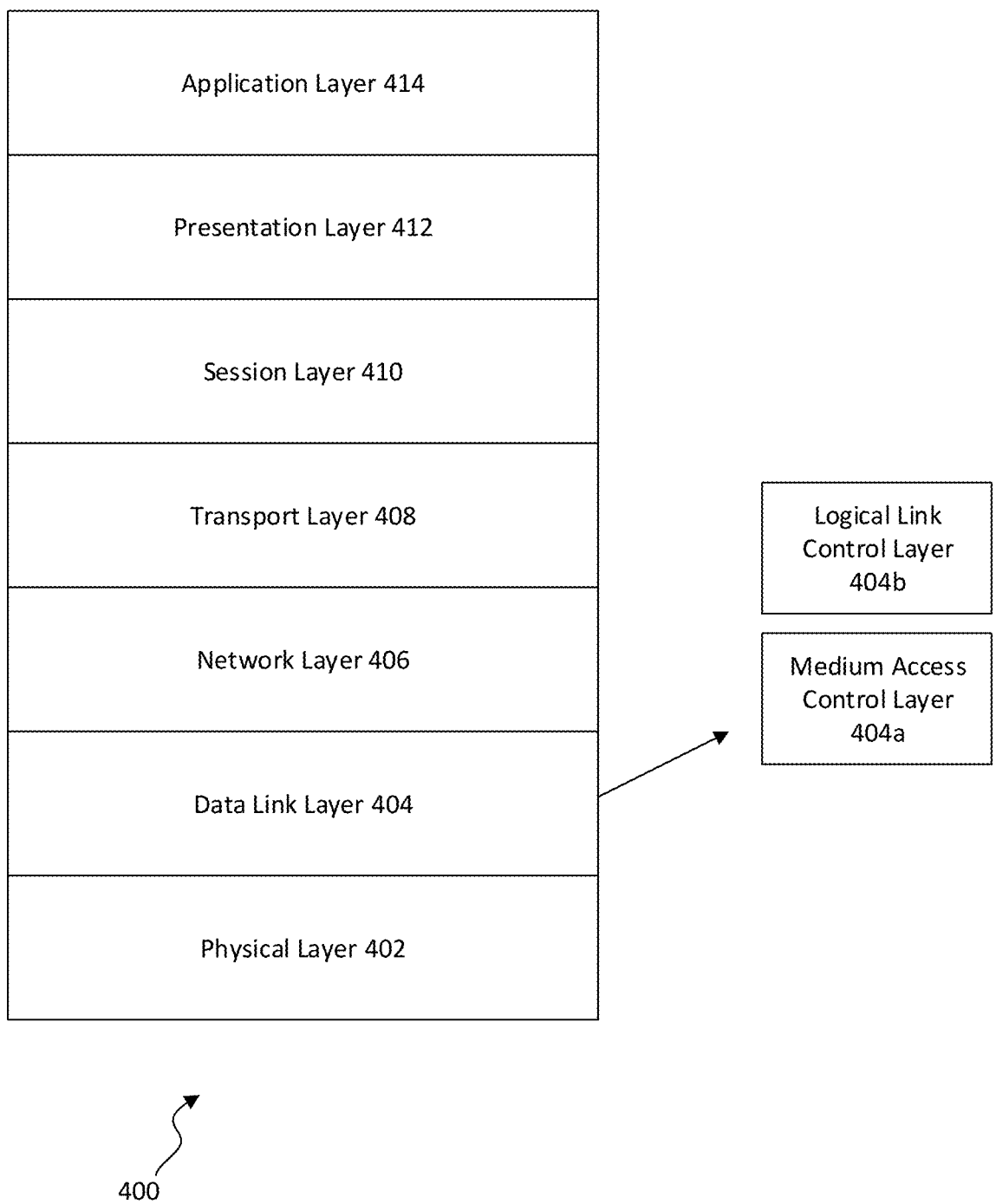
FIG. 4 depicts the Open Systems Interconnection Model.

The principles and methods described herein may be performed by specific circuitry configured to implement one or more particular logical layers as desired. Telecommunication systems and/or computer communication systems may be configured according to a plurality of logical layers. According to one aspect of the disclosure, this may be implemented according to the Open Systems Interconnection Model (OSI Model), which is depicted in FIG. 4. As shown herein, computer communication may occur wherein a transmission is received in a physical layer 402, which is generally responsible for transmission and/or reception of raw data and may operate by receiving radio signals and converting them into digital bits. The physical layer 402 may pass data associated with the received transmission to the data link layer 404, which includes a medium access control layer 404*a* and a logical link control layer 404*b*. The medium access control layer may, for example, interpret the raw bits decoded by the physical layer within a frame structure, perform transmission checks, perform frame delimiting, remove padding, and the like. Because the OSI structure is known, and because the conventional functions of the remaining layers are understood, it will merely be stated here that the data link layer 404 may pass data associated with the received transmission to the network layer 406, which may send information to the transport layer 408, which may send information to the session layer 410, which may send information to the presentation layer 412, which may send information to the application layer 414. The physical layer may be implemented in a physical layer circuitry. The medium access control layer may be implemented in a medium access control circuitry. According to an aspect of the disclosure, one or more processors may implement the physical layer circuitry and the medium access control circuitry.

According to an aspect of the disclosure, the one or more processors may be configured to analyze the channel switch signal in the physical layer domain without waking the MAC (e.g. while allowing the medium access control circuitry to remaining in a sleep or standby mode). By allowing the MAC to remain in a sleep or standby mode, the need to parse parallel frames in the MAC level is obviated, which represents a power savings.

According to an aspect of the disclosure, the decoding described herein may be performed in the physical layer circuitry. That is, the physical layer circuitry may be configured to decode any of the packet header parameters as described herein. Upon detecting one or more packet header parameters, the physical layer circuitry may be configured to determine whether the packet is irrelevant (e.g. not a channel switch signal) or relevant (e.g. is or may be a channel switch signal). During this period, the medium access control circuitry may be in a sleep mode or a standby mode.

If the physical layer circuitry determines that the packet is irrelevant, the physical layer circuitry may discontinue decoding some or all of the transmission while allowing the medium access control circuitry to remain in the standby mode or sleep mode. As stated above, and when the station intends to decode and process the packet data, multiple logical layers (e.g. multiple logical layers of the open systems interconnection model) and the circuitry to operate them will be active. Each logical layer generally corresponds to an increase in processing power and/or an energy requirement. By configuring the physical layer circuitry to decode and determine that a package is irrelevant, and thereby permitting this to occur while the medium access control circuitry remains in a standby mode or a sleep mode, an improvement in efficiency is increased.

Figure 5:
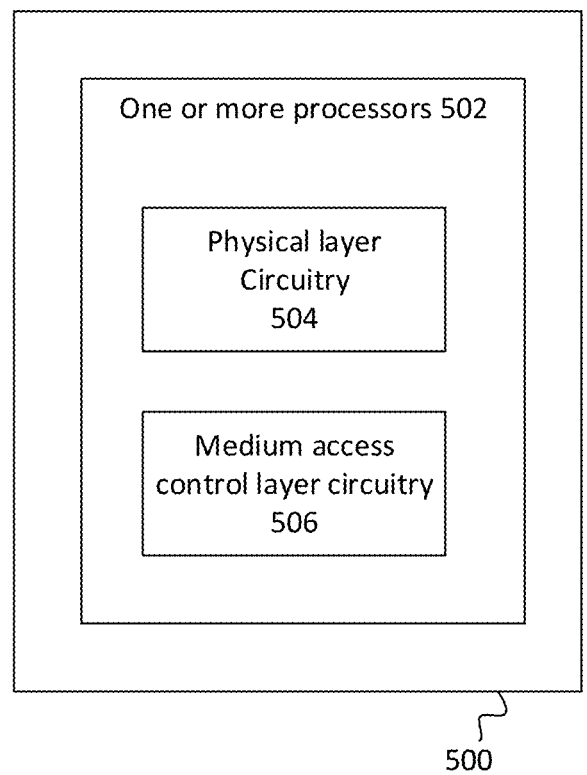
FIG. 5 depicts a wireless communication device.

FIG. 5 depicts a wireless communication device 500, according to an aspect of the disclosure. The wireless communication device 500 may include one or more processors 502 configured to implement a physical layer circuitry 504, which is configured to decode a received wireless signal and to output corresponding wireless signal data as one or more data packets, the wireless signal data representing the received wireless signal; and a medium access control layer circuitry 506, configured to operate according to at least an inactive mode or an active mode, wherein the inactive mode is a standby mode or a sleep mode, and wherein operating according to the active mode includes receiving the wireless signal data from the physical layer circuitry 504 and processing the wireless signal data according to one or more predefined medium access control layer routines; wherein the physical layer circuitry 504 is configured to determine one or more packet header parameters of the one or more data packets; and if the one or more packet header parameters are one or more predetermined values or within a predetermined range, instruct the medium access control layer circuitry to switch from the inactive mode to the active mode.

Figure 6:
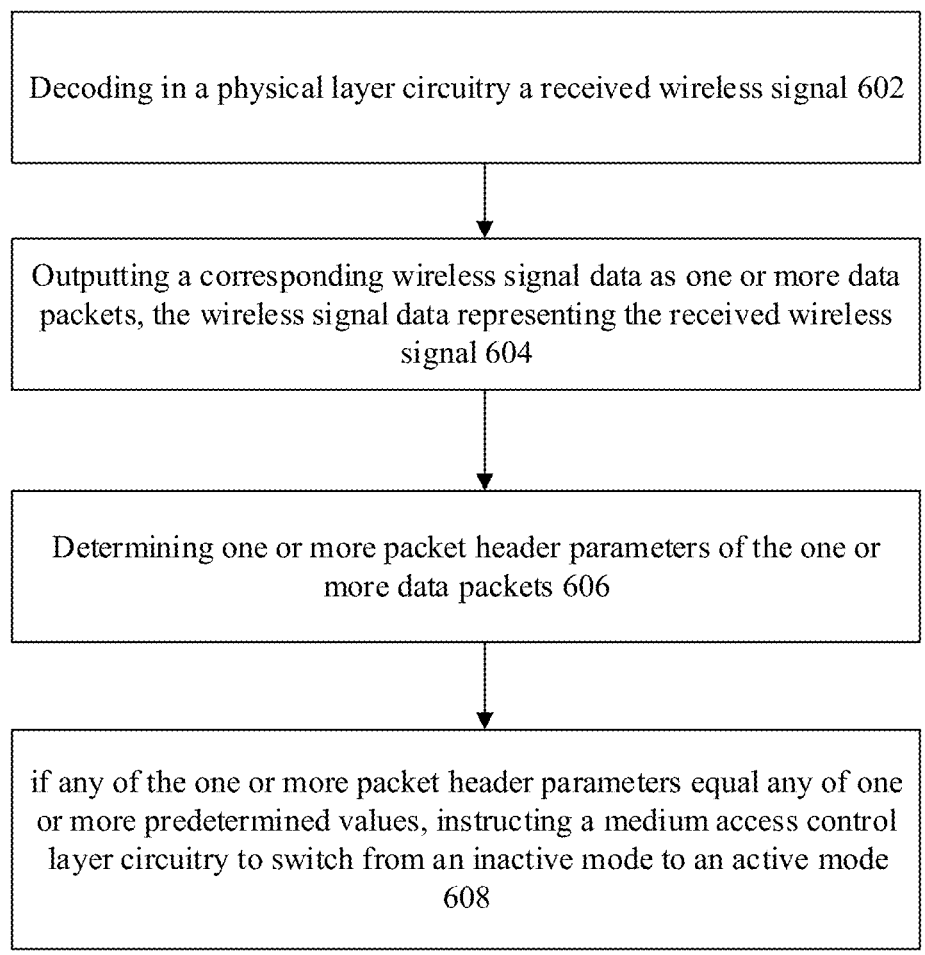
FIG. 6 depicts a method of wireless communication.

FIG. 6 depicts a method of wireless communication, according to an aspect of the disclosure, the method including: decoding in a physical layer circuitry a received wireless signal 602; outputting a corresponding wireless signal data as one or more data packets, the wireless signal data representing the received wireless signal 604; determining one or more packet header parameters of the one or more data packets 606; and if any of the one or more packet header parameters equal any of one or more predetermined values, instructing a medium access control layer circuitry to switch from an inactive mode to an active mode 608.

According to one aspect of the disclosure, such an improvement in efficiency may be realized by implementing the medium access control circuitry in a simplified form (e.g. since certain processing tasks have been assumed by the physical data layer circuitry), which may result in cost-savings. According to another aspect of the disclosure, such an improvement in efficiency may be realized by permitting the medium access control circuitry to remain in a sleep more or a standby mode, rather than waking the circuitry to process data for an irrelevant package.

If the physical layer circuitry determines that the packet is relevant, the physical layer circuitry may send a signal to the medium access control circuitry, the signal representing an instruction for the medium access control circuitry to switch from an inactive mode to an active mode. The medium access control circuitry may then receive data from the physical data layer circuitry and process the data for delivery to another layer (e.g. to the logical link control sublayer).

Alternatively or additionally, a new frame type and/or new frame sub-type (e.g. Type Extension, SubType—ESR Channel Switch which is transmitted in Non-HT PPDU) may be defined, such that said frame type and/or frame sub-type indicates whether the frame is a channel switch signal. With this, the STA may merely need to decode the Frame control field (carried in the first byte in the MAC header), which allows it to drop frames (discontinue decoding frames) faster (compared to, for example, waiting for the intended receiver address (RA) field, which is sent later in the MAC Header). For example, the RA field is 9 bytes into the MAC header. At 6 Mbps, this represents 12 us of additional delay in the decision whether to discontinue decoding the remainder of the frame.

The one or more processors may be configured to determine whether the one or more packet header parameters are not equal to the one or more predetermined values. If the one or more processors determine that the one or more packet header parameters are not equal to the one or more predetermined values, the physical layer circuitry may be configured not to instruct the medium access control layer circuitry to switch from the inactive mode to the active mode. In so doing, the physical layer circuitry may permit the medium access control layer circuitry to remain in the inactive mode.

The one or more packet header parameters may include any, or any combination, of a plurality of parameters. According to one aspect of the disclosure, one of the one or more parameters may be the physical data rate. As described above, a channel switch signal is not expected to be transmitted at a high throughput data rate (e.g. not a HT or greater) but rather is expected to be a non-HT data transmitted at rate. Thus, a transmission at a HT or above throughput is not expected to be a channel switch signal, and the physical layer circuitry can discontinue decoding the transmission (e.g. drop the frame) upon determining that the data rate is HT or greater.

According to an aspect of the disclosure, one of the one or more parameters may be the packet length. Although packets may be transmitted at a variety of lengths, the channel switch signal may be such that it is transmitted at a single predetermined packet length, or at any of a plurality of predetermined packet lengths, such as depending on the particular subcategory of channel switch signal. For example, a channel switch signal may be configured as an RTS transmission, which may have a single, predetermined frame length. As Wi-Fi 7 is still developing, and given that the principles and methods described herein may be applied to transmission protocols other than Wi-Fi. 7, the principles and methods herein should not be understood as being limited to a single, specific length of the RTS signal, but rather it is stated that a length (or even a plurality of lengths) associated with an RTS signal may be used. In this manner, if the physical layer circuitry decodes a frame indicating a frame length corresponding to an RTS or any other frame length corresponding to a channel switch signal, the physical layer circuitry may be configured to continue decoding and may further be configured to send a message to the medium Access control circuitry to cause the medium access control circuitry to enter an active state.

Conversely, if the detected packet length is not one of the one or more predetermined packet lengths that correspond to a channel switch signal, then the transmission is likely not a channel switch signal, and the physical layer circuitry may be configured not to send an instruction to awaken the medium access control circuitry. Furthermore, the physical layer circuitry may discontinue decoding the transmission (e.g. drop the frame).

According to an aspect of the disclosure, a station may perform a filtering/frame drop as described herein using an initial scrambler value (e.g. SCRAMBLER_INIT_VALUE).

For example, in IEEE 801.11ax (e.g. Wi-Fi 6), stations receive the SCRAMBLER_INIT_VALUE from a multiuser Request to Send (MU-RTS) receive vector, and all stations use this value for clear to send transmissions. In light of this, one or more predetermined values for the SCRAMBLER_INIT_VALUE may be defined, such that an access point may use these predetermined value in the MU-RTS in order to provide hints in the Phy level that this MU-RTS is carrying an eSR Trigger. Using this strategy, a station receiving a transmission will only wake a MAC layer and cause the MAC layer to decode if a frame's received scrambler initial value matches an expected value of the eSR Trigger (e.g. one of the one or more predetermined values). Conversely, if the scramble initial value does not match one of the one or more predetermined values, the physical layer will not wake the MAC layer, and the MAC layer will not decode the frame. It is noted that, under normal operation, there may be an occasional false eSR trigger, in which the scrambler uses the initial value for other frames; however, this can be cross-checked, such as with the expected L-SIG length range.

Throughout this disclosure, the frame type RTS is described as being a channel switch signal which may prompt the physical layer circuitry to send an instruction to awaken the medium access control circuitry. Wi-Fi 7 includes a frame type known as the "Multiple User RTS" (MU-RTS), in which a RTS is sent from an AP to which multiple users are subscribed. The functions of the physical layer circuitry with respect to the medium access control circuitry for a RTS header should be understood to also apply to a MU-RTS. That is, when the physical layer circuitry decodes a header having a header length field corresponding to a MU-RTS header, the physical layer circuitry may be configured to send an instruction to awaken the medium access control circuitry, and the physical layer circuitry may be configured to continue decoding the transmission, at least until the physical layer circuitry detects an aspect of the transmission indicating that the transmission is irrelevant to the station (e.g. the indented recipient is not the station).

According to an aspect of the disclosure, the packet length corresponding to the one or more packet lengths for which the physical layer circuitry should send a message to the medium access control circuitry to cause the medium access control circuitry to enter an active state, may be dependent on a number of users, such as in an MU-.RTS. For example, the relevant packet length may be calculated by a predetermined number of bytes plus a value multiplied by a number of users. For example, the packet length may be 24 bytes+ 5*Number of Users. When the frame length as decoded by the physical layer equals this amount, there is an indication that the transmitted frame is a channel switch signal, and therefore the physical layer circuitry may be configured to send an instruction to awaken the medium access control circuitry and/or to continue decoding the transmission. Conversely, where the packet length is different from this value, the physical layer circuitry may be configured to discontinue decoding the transmission (e.g. drop the frame) and not to instruct the MAC circuitry to wake up.

According to an aspect of the disclosure, the one or more packet parameters may further be an intended recipient. The intended recipient may be decoded, for example, from the recipient address field of the header. If the intended recipient matches a recipient identification of the wireless communication device, the physical layer circuitry may be configured to send an instruction to awaken the medium access control layer circuitry (e.g. to switch from the inactive mode to the active mode).

If the one or more packet parameters decoded by the physical layer circuitry are not one of the one or more predetermined packet parameters, the physical layer circuitry may be configured to stop decoding a reminder of wireless signal representing the data packet.

Further aspects of the disclosure are disclosed below by way of examples.

In Example 1, a wireless communication device is disclosed including: one or more processors configured to implement a physical layer circuitry, configured to decode a received wireless signal and to output corresponding wireless signal data as one or more data packets, the wireless signal data representing the received wireless signal; and a medium access control layer circuitry, configured to operate according to at least an inactive mode or an active mode, wherein the inactive mode is a standby mode or a sleep mode, and wherein operating according to the active mode includes receiving the wireless signal data from the physical layer circuitry and processing the wireless signal data according to one or more predefined medium access control layer routines; wherein the physical layer circuitry is configured to determine one or more packet header parameters of the one or more data packets; and if any of the one or more packet header parameters equal any of one or more predetermined values, instruct the medium access control layer circuitry to switch from the inactive mode to the active mode.

In Example 2, the wireless communication device of Example 1 is disclosed, wherein, if none of the one or more packet header parameters match any of the one or more predetermined values, the physical layer circuitry is configured not to instruct the medium access control layer circuitry to switch from the inactive mode to the active mode, and to permit the medium access control layer circuitry to remain in the inactive mode.

In Example 3, the wireless communication device of Example 1 or 2 is disclosed, wherein the one or more packet header parameters include a physical data rate.

In Example 4, the wireless communication device of Example 3 is disclosed, wherein a non-high throughout (non-HT) physical data rate is one of the one or more predetermined values.

In Example 5, the wireless communication device of Example 4 is disclosed, wherein none of a high throughput physical data rate; a very high throughput physical data rate; a high efficiency physical data rate; or an extremely high throughput physical data rate are any of the one or more predetermined values.

In Example 6, the wireless communication device of any one of Examples 1 to 5 is disclosed, wherein the one or more packet header parameters include a header type.

In Example 7, the wireless communication device of Example 6 is disclosed, wherein a Channel switch signal header type is one of the one or more predetermined values.

In Example 8, the wireless communication device of Example 7 is disclosed, wherein a Request to Send header type is one of the one or more predetermined values.

In Example 9, the wireless communication device of Example 8 is disclosed, wherein a Multiple-User Request to Send (MU-RTS) header type is one of the one or more predetermined values.

In Example 10, the wireless communication device of Example 9 is disclosed, wherein a header type having a value of 10 or 11 is one of the one or more predetermined values.

In Example 11, the wireless communication device of any one of Examples 1 to 10 is disclosed, wherein the one or more packet header parameters include a header length.

In Example 12, the wireless communication device of Example 11 is disclosed, wherein a header length of a length of a Channel switch signal is one of the one or more predetermined values.

In Example 13, the wireless communication device of Example 12 is disclosed, wherein a header length of a Request to Send frame is one of the one or more predetermined values.

In Example 14, the wireless communication device of Example 13 is disclosed, wherein a header length of a Multiple-User Request to Send (MU-RTS) frame is one of the one or more predetermined values.

In Example 15, the wireless communication device of Example 14 is disclosed, wherein a header length as calculated by 24 bytes+5*a number of users equals one of the one or more predetermined values.

In Example 16, the wireless communication device of any one of Examples 1 to 15 is disclosed, wherein the one or more packet parameters further include an intended recipient, and wherein the physical layer circuitry is configured to instruct the medium access control layer circuitry to switch from the inactive mode to the active mode if the intended recipient matches a recipient identification of the wireless communication device.

In Example 17, the wireless communication device of Example 16 is disclosed, wherein the intended recipient is decoded from a header of the data packet.

In Example 18, the wireless communication device of any one of Examples 1 to 17 is disclosed, wherein the one or more packet parameters further include a sender, and wherein the physical layer circuitry is configured to instruct the medium access control layer circuitry to switch from the inactive mode to the active mode if a sender of the data packet matches one or more predetermined senders.

In Example 19, the wireless communication device of Example 18 is disclosed, wherein the sender is decoded from a header of the data packet.

In Example 20, the wireless communication device of any one of Examples 1 to 19 is disclosed, wherein, if the one or more packet parameters do not equal any of the one or more predetermined values, the physical layer circuitry is configured to stop decoding a remainder of the wireless signal representing the data packet.

In Example 21, a non-transitory computer readable medium, including instructions, which, if executed, cause one or more processors implementing a physical layer circuitry to: decode a received wireless signal and to output corresponding wireless signal data as one or more data packets, the wireless signal data representing the received wireless signal; determine one or more packet header parameters of the one or more data packets; and if any of the one or more packet header parameters equal any of one or more predetermined values, instruct a medium access control layer circuitry to switch from an inactive mode to an active mode.

In Example 22, the non-transitory computer readable medium of Example 1 is disclosed, wherein, if none of the one or more packet header parameters match any of the one or more predetermined values, the instructions are configured to cause the one or more processors implementing the physical layer circuitry not to instruct the medium access control layer circuitry to switch from the inactive mode to the active mode, and to permit the medium access control layer circuitry to remain in the inactive mode.

In Example 23, the non-transitory computer readable medium of Example 21 or 22 is disclosed, wherein the one or more packet header parameters include a physical data rate.

In Example 24, the non-transitory computer readable medium of Example 23 is disclosed, wherein a non-high throughout (non-HT) physical data rate is one of the one or more predetermined values.

In Example 25, the non-transitory computer readable medium of Example 24 is disclosed, wherein none of a high throughput physical data rate; a very high throughput physical data rate; a high efficiency physical data rate; or an extremely high throughput physical data rate are any of the one or more predetermined values.

In Example 26, the non-transitory computer readable medium of any one of Examples 21 to 25 is disclosed, wherein the one or more packet header parameters include a header type.

In Example 27, the non-transitory computer readable medium of Example 26 is disclosed, wherein a Channel switch signal header type is one of the one or more predetermined values.

In Example 28, the non-transitory computer readable medium of Example 27 is disclosed, wherein a Request to Send header type is one of the one or more predetermined values.

In Example 29, the non-transitory computer readable medium of Example 28 is disclosed, wherein a Multiple-User Request to Send (MU-RTS) header type is one of the one or more predetermined values.

In Example 30, the non-transitory computer readable medium of Example 29 is disclosed, wherein a header type having a value of 10 or 11 is one of the one or more predetermined values.

In Example 31, the non-transitory computer readable medium of any one of Examples 21 to 30 is disclosed, wherein the one or more packet header parameters include a header length.

In Example 32, the non-transitory computer readable medium of Example 31 is disclosed, wherein a header length of a length of a Channel switch signal is one of the one or more predetermined values.

In Example 33, the non-transitory computer readable medium of Example 32 is disclosed, wherein a header length of a Request to Send frame is one of the one or more predetermined values.

In Example 34, the non-transitory computer readable medium of Example 33 is disclosed, wherein a header length of a Multiple-User Request to Send (MU-RTS) frame is one of the one or more predetermined values.

In Example 35, the non-transitory computer readable medium of Example 34 is disclosed, wherein a header length as calculated by 24 bytes+5*a number of users equals one of the one or more predetermined values.

In Example 36, the non-transitory computer readable medium of any one of Examples 21 to 35 is disclosed, wherein the one or more packet parameters further include an intended recipient, and wherein instructions are configured to cause the one or more processors implementing the physical layer circuitry to instruct the medium access control layer circuitry to switch from the inactive mode to the active mode if the intended recipient matches a recipient identification of the wireless communication device.

In Example 37, the non-transitory computer readable medium of Example 36 is disclosed, wherein the intended recipient is decoded from a header of the data packet.

In Example 38, the non-transitory computer readable medium of any one of Examples 21 to 37 is disclosed, wherein the one or more packet parameters further include a sender, and wherein the instructions are configured to cause the one or more processors implementing the physical layer circuitry to instruct the medium access control layer circuitry to switch from the inactive mode to the active mode if a sender of the data packet matches one or more predetermined senders.

In Example 39, the non-transitory computer readable medium of Example 38 is disclosed, wherein the sender is decoded from a header of the data packet.

In Example 40, the non-transitory computer readable medium of any one of Examples 21 to 39 is disclosed, wherein, if the one or more packet parameters do not equal any of the one or more predetermined values, the instructions are configured to cause the one or more processors implementing the physical layer circuitry to stop decoding a remainder of the wireless signal representing the data packet.

In Example 41, a method of wireless communication is disclosed including: decoding in a physical layer circuitry a received wireless signal; outputting a corresponding wireless signal data as one or more data packets, the wireless signal data representing the received wireless signal; determining one or more packet header parameters of the one or more data packets; and if any of the one or more packet header parameters equal any of one or more predetermined values, instruct a medium access control layer circuitry to switch from an inactive mode to an active mode.

In Example 42, the method of wireless communication of Example 1 is disclosed, further including not instructing the medium access control layer circuitry to switch from the inactive mode to the active mode, and permitting the medium access control layer circuitry to remain in the inactive mode, if none of the one or more packet header parameters match any of the one or more predetermined values.

In Example 43, the method of wireless communication of Example 41 or 42 is disclosed, wherein the one or more packet header parameters include a physical data rate.

In Example 44, the method of wireless communication of Example 43 is disclosed, wherein a non-high throughout (non-HT) physical data rate is one of the one or more predetermined values.

In Example 45, the method of wireless communication of Example 44 is disclosed, wherein none of a high throughput physical data rate; a very high throughput physical data rate; a high efficiency physical data rate; or an extremely high throughput physical data rate are any of the one or more predetermined values.

In Example 46, the method of wireless communication of any one of Examples 41 to 45 is disclosed, wherein the one or more packet header parameters include a header type.

In Example 47, the method of wireless communication of Example 46 is disclosed, wherein a Channel switch signal header type is one of the one or more predetermined values.

In Example 48, the method of wireless communication of Example 47 is disclosed, wherein a Request to Send header type is one of the one or more predetermined values.

In Example 49, the method of wireless communication of Example 48 is disclosed, wherein a Multiple-User Request to Send (MU-RTS) header type is one of the one or more predetermined values.

In Example 50, the method of wireless communication of Example 49 is disclosed, wherein a header type having a value of 10 or 11 is one of the one or more predetermined values.

In Example 51, the method of wireless communication of any one of Examples 41 to 50 is disclosed, wherein the one or more packet header parameters include a header length.

In Example 52, the method of wireless communication of Example 51 is disclosed, wherein a header length of a length of a Channel switch signal is one of the one or more predetermined values.

In Example 53, the method of wireless communication of Example 52 is disclosed, wherein a header length of a Request to Send frame is one of the one or more predetermined values.

In Example 54, the method of wireless communication of Example 53 is disclosed, wherein a header length of a Multiple-User Request to Send (MU-RTS) frame is one of the one or more predetermined values.

In Example 55, the method of wireless communication of Example 54 is disclosed, wherein a header length as calculated by 24 bytes+5*a number of users equals one of the one or more predetermined values.

In Example 56, the method of wireless communication of any one of Examples 41 to 55 is disclosed, wherein the one or more packet parameters further include an intended recipient; further including instructing the medium access control layer circuitry to switch from the inactive mode to the active mode if the intended recipient matches a recipient identification of the wireless communication device.

In Example 57, the method of wireless communication of Example 56 is disclosed, wherein the intended recipient is decoded from a header of the data packet.

In Example 58, the method of wireless communication of any one of Examples 41 to 57 is disclosed, wherein the one or more packet parameters further include a sender; further including instructing the medium access control layer circuitry to switch from the inactive mode to the active mode if a sender of the data packet matches one or more predetermined senders.

In Example 59, the method of wireless communication of Example 58 is disclosed, wherein the sender is decoded from a header of the data packet.

In Example 60, the method of wireless communication of any one of Examples 41 to 59 is disclosed, wherein the one or more packet parameters do not equal any of the one or more predetermined values; further including discontinuing decoding a remainder of the wireless signal representing the data packet.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

What is claimed is:

1. A wireless communication device comprising:
one or more processors configured to implement a physical layer circuitry, configured to decode a received wireless signal and to output corresponding wireless signal data as one or more data packets, the wireless signal data representing the received wireless signal; and
a medium access control layer circuitry, configured to operate according to at least an inactive mode or an active mode, wherein the inactive mode is a standby mode or a sleep mode, and wherein operating according to the active mode comprises receiving the wireless signal data from the physical layer circuitry and processing the wireless signal data according to one or more predefined medium access control layer routines;
wherein the physical layer circuitry is configured to determine one or more packet header parameters of the one or more data packets; and
if any of the one or more packet header parameters equals any of one or more predetermined values, instruct the medium access control layer circuitry to switch from the inactive mode to the active mode; and
wherein, if none of the one or more packet header parameters match any of the one or more predetermined values, the physical layer circuitry is configured not to instruct the medium access control layer circuitry to switch from the inactive mode to the active mode, and to permit the medium access control layer circuitry to remain in the inactive mode.

2. The wireless communication device of claim 1, wherein the one or more packet header parameters comprise a physical data rate.

3. The wireless communication device of claim 2, wherein a non-high throughout (non-HT) physical data rate is one of the one or more predetermined values.

4. The wireless communication device of claim 3, wherein none of a high throughput physical data rate; a very high throughput physical data rate; a high efficiency physical data rate; or an extremely high throughput physical data rate are any of the one or more predetermined values.

5. The wireless communication device of claim 1, wherein the one or more packet header parameters comprise a header type.

6. The wireless communication device of claim 5, wherein a Channel switch signal header type is one of the one or more predetermined values.

7. The wireless communication device of claim 6, wherein a Request to Send header type is one of the one or more predetermined values.

8. The wireless communication device of claim 7, wherein a Multiple-User Request to Send (MU-RTS) header type is one of the one or more predetermined values.

9. The wireless communication device of claim 1, wherein the one or more packet header parameters comprise a header length.

10. The wireless communication device of claim 9, wherein a header length of a length of a Channel switch signal is one of the one or more predetermined values.

11. The wireless communication device of claim 10, wherein a header length as calculated by 24 bytes+5*a number of users equals one of the one or more predetermined values.

12. The wireless communication device of claim 1, wherein the one or more packet parameters further comprise an intended recipient, and wherein the physical layer circuitry is configured to instruct the medium access control layer circuitry to switch from the inactive mode to the active mode if the intended recipient matches a recipient identification of the wireless communication device.

13. The wireless communication device of claim 1, wherein the one or more packet parameters further comprise a sender, and wherein the physical layer circuitry is configured to instruct the medium access control layer circuitry to switch from the inactive mode to the active mode if a sender of the data packet matches one or more predetermined senders.

14. The wireless communication device of claim 1, wherein, if the one or more packet parameters do not equal any of the one or more predetermined values, the physical layer circuitry is configured to stop decoding a remainder of the wireless signal representing the data packet.

15. A non-transitory computer readable medium, comprising instructions, which, if executed, cause one or more processors implementing a physical layer circuitry to:
   decode a received wireless signal and to output corresponding wireless signal data as one or more data packets, the wireless signal data representing the received wireless signal;
   determine one or more packet header parameters of the one or more data packets; and
   if any of the one or more packet header parameters equals any of one or more predetermined values, instruct a medium access control layer circuitry to switch from an inactive mode to an active mode;
   wherein, if none of the one or more packet header parameters match any of the one or more predetermined values, the instructions are configured to cause the one or more processors implementing the physical layer circuitry not to instruct the medium access control layer circuitry to switch from the inactive mode to the active mode, and to permit the medium access control layer circuitry to remain in the inactive mode.

16. The non-transitory computer readable medium of claim 15, wherein the one or more packet header parameters comprise a physical data rate.

17. The non-transitory computer readable medium of claim 15, wherein a non-high throughout (non-HT) physical data rate is one of the one or more predetermined values.

18. The non-transitory computer readable medium of claim 15, wherein none of a high throughput physical data rate; a very high throughput physical data rate; a high efficiency physical data rate; or an extremely high throughput physical data rate are any of the one or more predetermined values.

* * * * *